US011178820B2

(12) United States Patent
Bertino et al.

(10) Patent No.: US 11,178,820 B2
(45) Date of Patent: Nov. 23, 2021

(54) GRAIN-HARVESTING FARMING EQUIPMENT

(71) Applicant: Indústrias Reunidas Colombo Ltda, Pindorama (BR)

(72) Inventors: Luiz Henrique Bertino, Pindorama (BR); Alexandre Aparecido Crescio, Pindorama (BR)

(73) Assignee: Indústrias Reunidas Colombo Ltda, Pindorama (BR)

( * ) Notice: Subject to any disclaimer, the term of this patent is extended or adjusted under 35 U.S.C. 154(b) by 367 days.

(21) Appl. No.: 16/257,958

(22) Filed: Jan. 25, 2019

(65) Prior Publication Data

US 2020/0236855 A1 Jul. 30, 2020

(51) Int. Cl.
*A01D 51/00* (2006.01)
*A01D 29/00* (2006.01)
*A01F 7/06* (2006.01)
*A01F 12/18* (2006.01)

(52) U.S. Cl.
CPC ............ *A01D 51/002* (2013.01); *A01D 29/00* (2013.01); *A01F 7/06* (2013.01); *A01F 12/184* (2013.01)

(58) Field of Classification Search
CPC ......... A01D 51/002; A01D 29/00; A01F 7/06; A01F 12/184
See application file for complete search history.

(56) References Cited

U.S. PATENT DOCUMENTS

| | | | |
|---|---|---|---|
| 3,669,291 A | 6/1972 | De Coene | |
| 5,443,352 A | 8/1995 | Schuhmacher | |
| 9,788,488 B2 | 10/2017 | Bertino | |
| 10,952,376 B1* | 3/2021 | Nichols | ............... B02C 18/0084 |
| 2008/0295476 A1 | 12/2008 | Bertino | |
| 2016/0302361 A1* | 10/2016 | Bojsen | ............... A01D 41/1274 |
| 2016/0316626 A1* | 11/2016 | Bertino | ................ A01F 12/184 |
| 2017/0367263 A1* | 12/2017 | Robert | ...................... B07B 1/46 |
| 2019/0183051 A1* | 6/2019 | Matsuo | ................ A01D 51/002 |

* cited by examiner

*Primary Examiner* — Abigail A Risic
(74) *Attorney, Agent, or Firm* — McKee, Voorhees & Sease, PLC

(57) ABSTRACT

Agricultural implements include equipment designed for harvesting, cleaning and storing farming produce. The farming produce it is designed to process particularly includes peanuts, beans or any other produce disposed in rows that can be gathered from the ground. The agricultural equipment can include a head (2), endowed with a collecting platform (3) with belts (5); with the head (2) including a transmission box (4) of the dual and pivotable type. The head (2) has complete hydraulic system with hydraulic oil tank (9), heat exchanger (9A) and filters, and the transmission box (4) further has an auxiliary input (11) to couple an accessory that can be hydraulic, pneumatic or electric, in order to drive auxiliary systems. In the rear part of the equipment are helicoids (6) that extend to the vertical transporter (7) and latter to the container (8).

15 Claims, 26 Drawing Sheets

GRAIN-HARVESTING FARMING EQUIPMENT

FIELD OF THE INVENTION

The present application for patent of invention refers to equipment designed for harvesting, cleaning and storing farming produce. Among the farming produce it is designed to process are peanuts, beans or any other product disposed in rows that can be gathered from the ground.

Accordingly, the equipment of the invention uses a tractor-type farming vehicle that will provide the driving power of the crop processing systems.

Therefore, the invention may be considered to belong to the mechanical and agronomic engineering sectors.

STATE OF THE ART

Several machines designed to harvest and process grain are known today. The following patent references can be cited: US20080295476 A1 and U.S. Pat. No. 9,788,488 B2.

The equipment cited above consist of various systems that work together to carry out the harvest. Among these are a vertical mug transporter as provided in U.S. Pat. No. 9,788,488 B2; in particular, this document, by way of the drawings, shows a vertical transporter having two inputs, but does not protect the technical characteristic of two grain flow inputs in the same transporter.

Another system, described in document U.S. Pat. No. 9,788,488 B2, consists of conventional head, whose power transmission is carried out by way of a dual pivoting transmission box.

The document US20080295476 A1 describes a ventilator used to clean debris through suction of impurities that flow through the sieve before entering the vertical transporter and, further, this same ventilator blow the coarser debris from the threshing cylinder (rotor).

The current state of the art further comprises a grain storage system disclosed in document US005443352 A. This system has an arrangement of the helicoids so as to allow the distribution of the grain in the reservoir; document U.S. Pat. No. 3,669,291 describes an arrangement in which the helicoids are disposed crosswise at the bottom of the reservoir in order to empty the system.

Problems and Shortcomings of the State of the Art, Overcome by the Invention The following situations are essentially highlighted:

The traction equipment has a head with the sole function of pulling the implement. The transmission of power is by way of a cardan, which limits the maneuver movement of the equipment, in view of the need to turn off the traction system to perform the maneuvers;

The standard power take-off of the tractor may not satisfy the needs of the implement, which requires an extra socket for connecting pumps that have to be adapted to the cardan transmission;

It is still an issue in the state of the art to adapt a hydraulic oil reservoir in the implement to provide oil to the extra hydraulic socket;

As a result of this adaptation, there is a need to keep verifying the hydraulic fluid levels and filtering means of this system in which they are currently located in the implement, making it necessary to provide safe means of access;

High capacity grain-harvesters have vertical transport systems, on both sides of the equipment, this system being powered by just one socket. Since it uses two systems, the amount of mobile components increases;

Further, the use of two vertical transporters means that the width of the equipment is based on the vertical transport which could be used to perform the axial transport of the product;

The input of the vertical transporter occurs abruptly. There is no gradual transition so as to permit the input of the product in a smooth manner in the vertical transporter;

The equipment is manufactured in a large-dimensional single structure, which hampers transport;

The equipment is large and many transmissions are mechanical, by way of belts, so less robust;

The current equipment has a suction system for deficient debris, some vacuuming, others blow, and others vacuuming and blowing at two different points. None of them have a cleaning flow from the grain unloaded from the storage reservoir;

The distribution inside the reservoir is deficient, meaning the grain is damaged and the reservoir is not fully exploited;

the reservoir unloading system has deficiencies and covers a small area of said reservoir.

General Description of the Invention

The farming implement, object of this invention, is designed to harvest farming produce disposed in rows, such as peanuts and beans. It comprises large-scale equipment for large harvest volumes, in addition to having arrangement improvements to facilitate manufacturing, assembly, maintenance and provide performance gains. Its performance is comparable to that of two conventional machines, but on a single chassis. The invention encompasses efficiency gains by using mostly mechanical transmissions (cardans and transmission boxes), besides simplifying the number of components. The cleaning system also presents performance gains.

OBJECTIVE OF THE INVENTION

The main objective of the invention is to provide large-scale grain-harvesting equipment for large areas, with performance gains over the state of the art, easy maintenance, easy maneuvering, manufacturing and transport facility.

Advantages of the Invention

Besides the obvious ones in the preceding description, the following advantages can be emphasized:

Compact head integrated with the hydraulic system, which facilitates maintenance, said head containing a dual and pivoting transmission box with availability for coupling a hydraulic pump, oil reservoir integrated to the structure and heat exchanger, latter with an arrangement favoring its performance, as it enables a free air flow without obstructions and also having lower susceptibility to the entry of dust, preventing clogging;

Vertical transport system with dual feed with better use of space, enabling better use of the width of the equipment for processing the grain, and that simplifies the transport system, enabling better gain distribution in the container;

Robustness and reliability in its use of mechanical transmissions through transmission boxes (by gears) and cardan;

Cleaning system and vacuum sorting at the unloading point of the vertical transporter in the container, making the grain cleaning more efficient;

Modularity: facilitates manufacturing and disassembly for transport;

Container with more efficient grain distribution system, with better occupation of the volume of the container by using a system of at least four helicoids.

Container with efficient unloading system that enables a reduction in grain damage by using a helicoid with flexible elements.

DESCRIPTION OF THE DRAWINGS

The GRAIN-HARVESTING FARMING EQUIPMENT object of this application for patent of invention will be described below in an embodiment, and for improved understanding references will be made to the accompanying drawings, represented as follows.

DETAILED DESCRIPTION OF THE INVENTION

Figure 1:
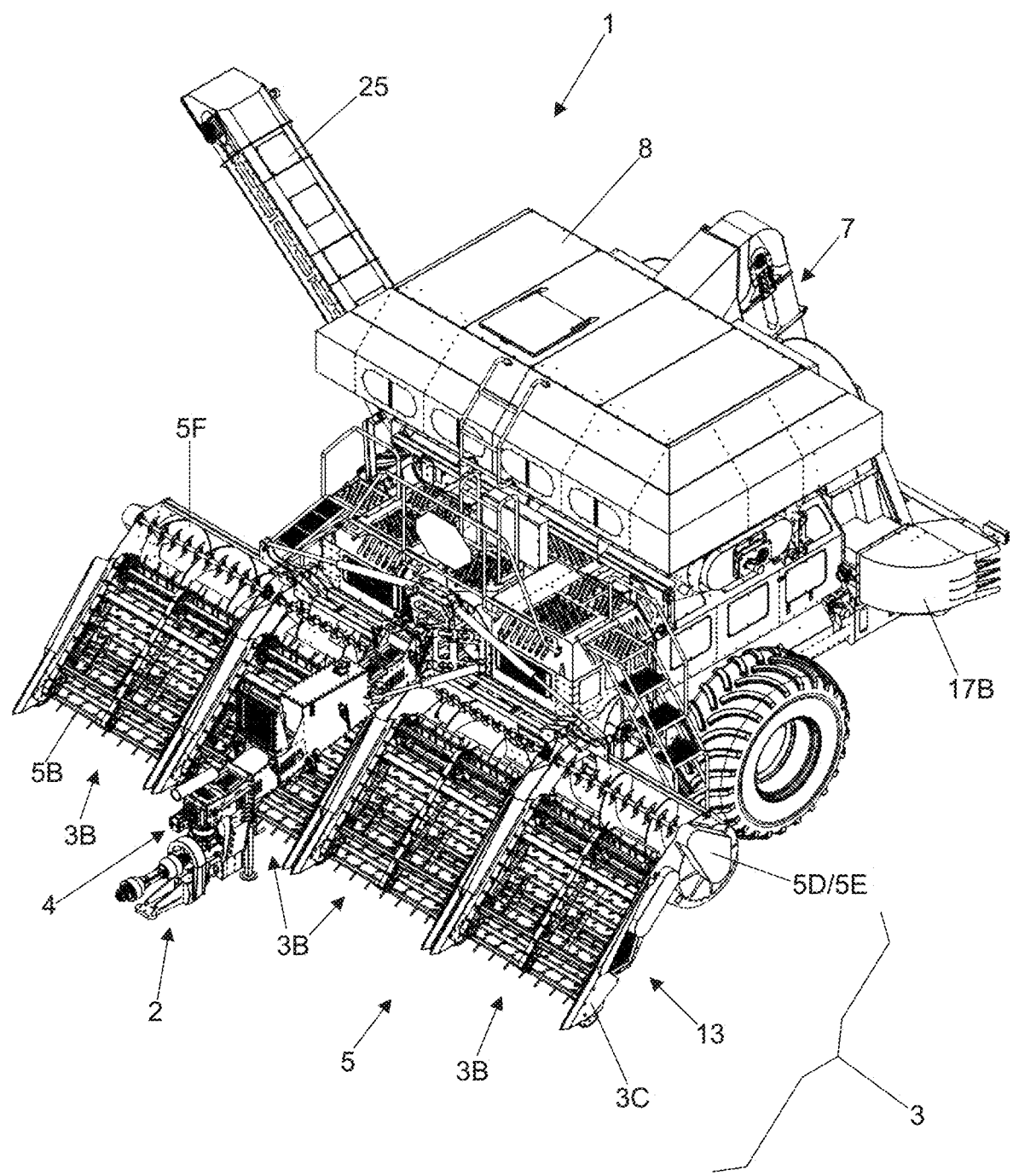
FIG. 1: Perspective view of the equipment in full, according to the invention.
Figure 2:
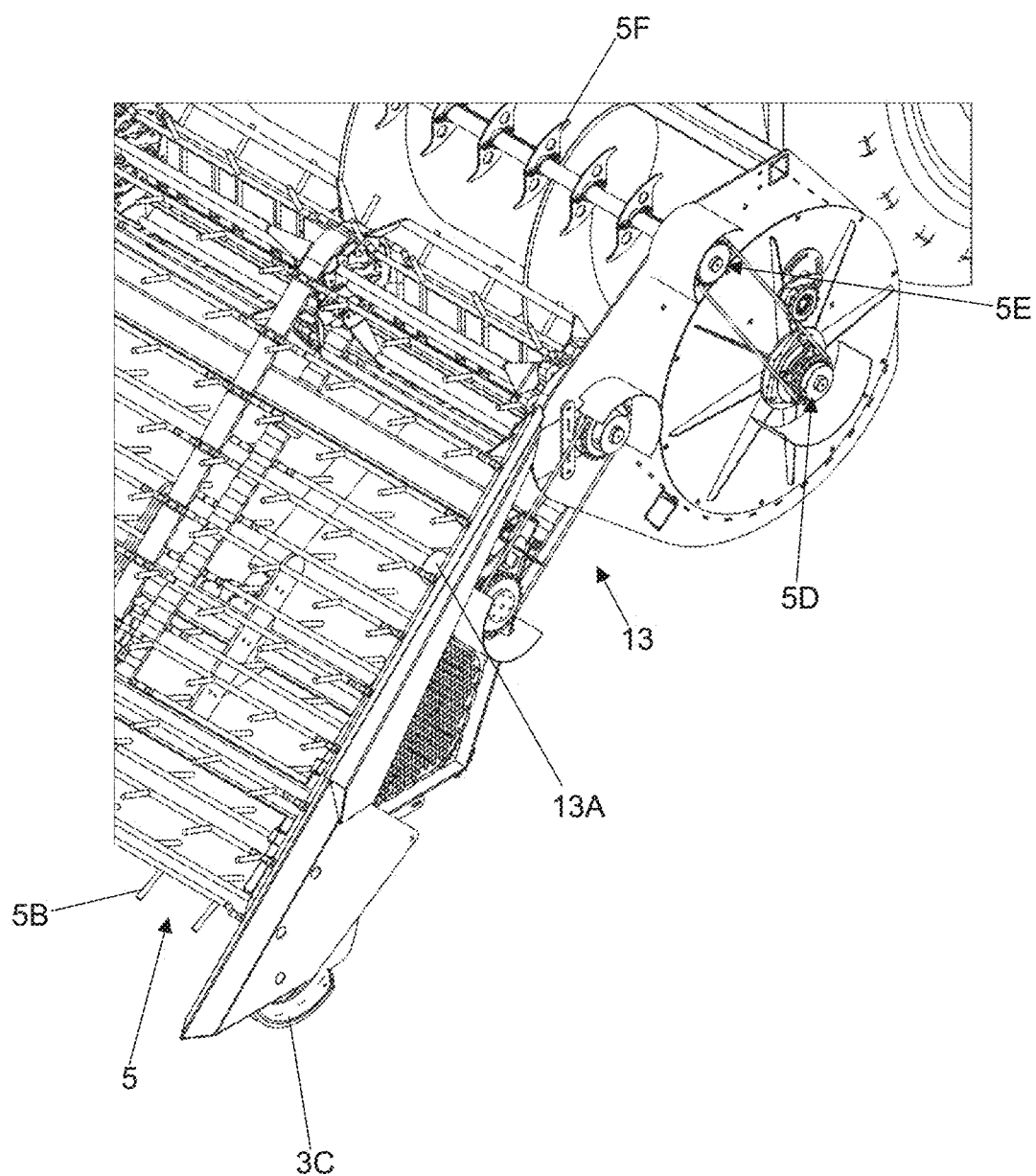
FIG. 2: Detail in partially blown-up perspective of the collector platform with the driving means of same.
Figure 3:
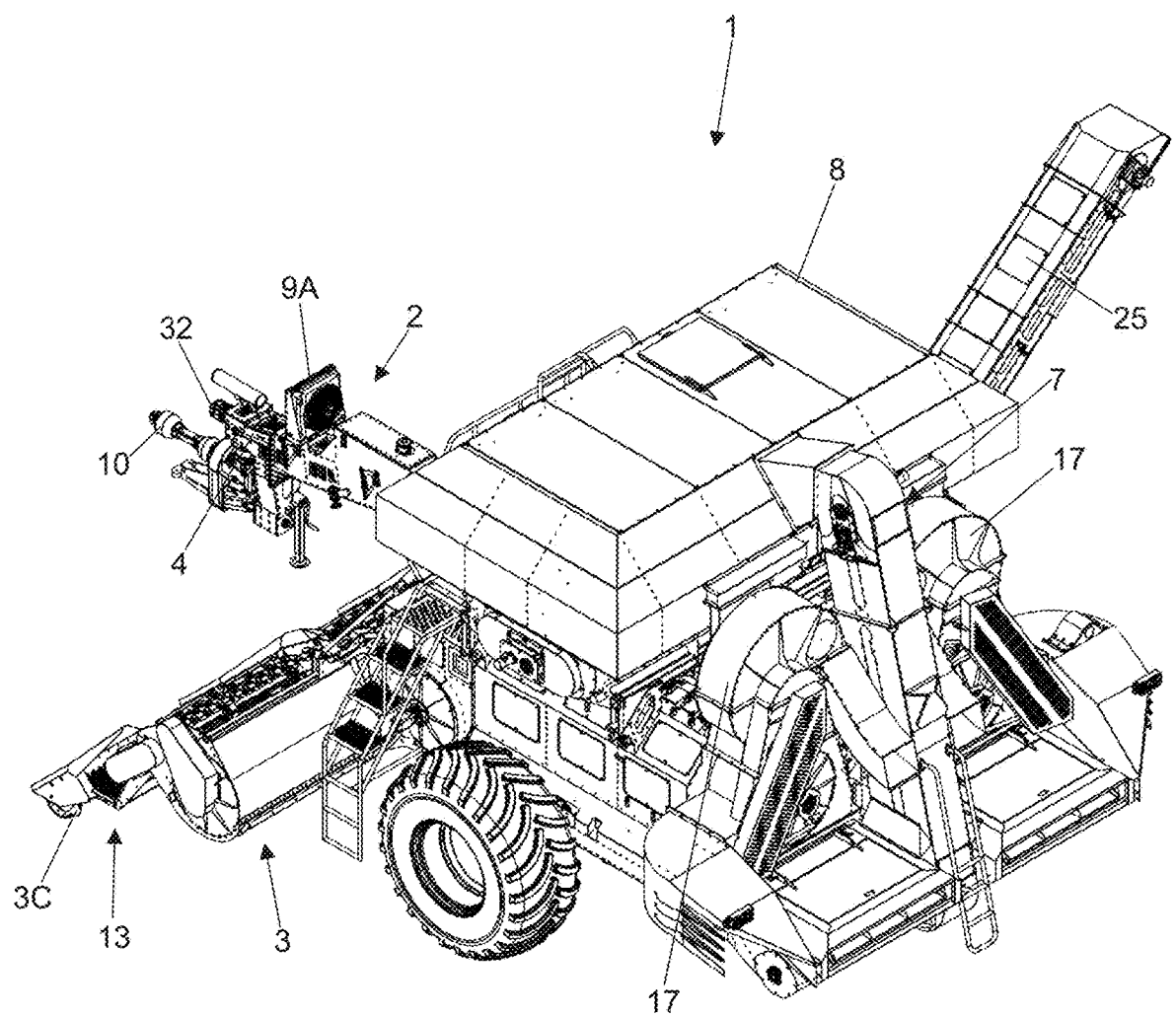
FIG. 3: Perspective view of the equipment in full, according to the invention, seen from another angle.
Figure 4:
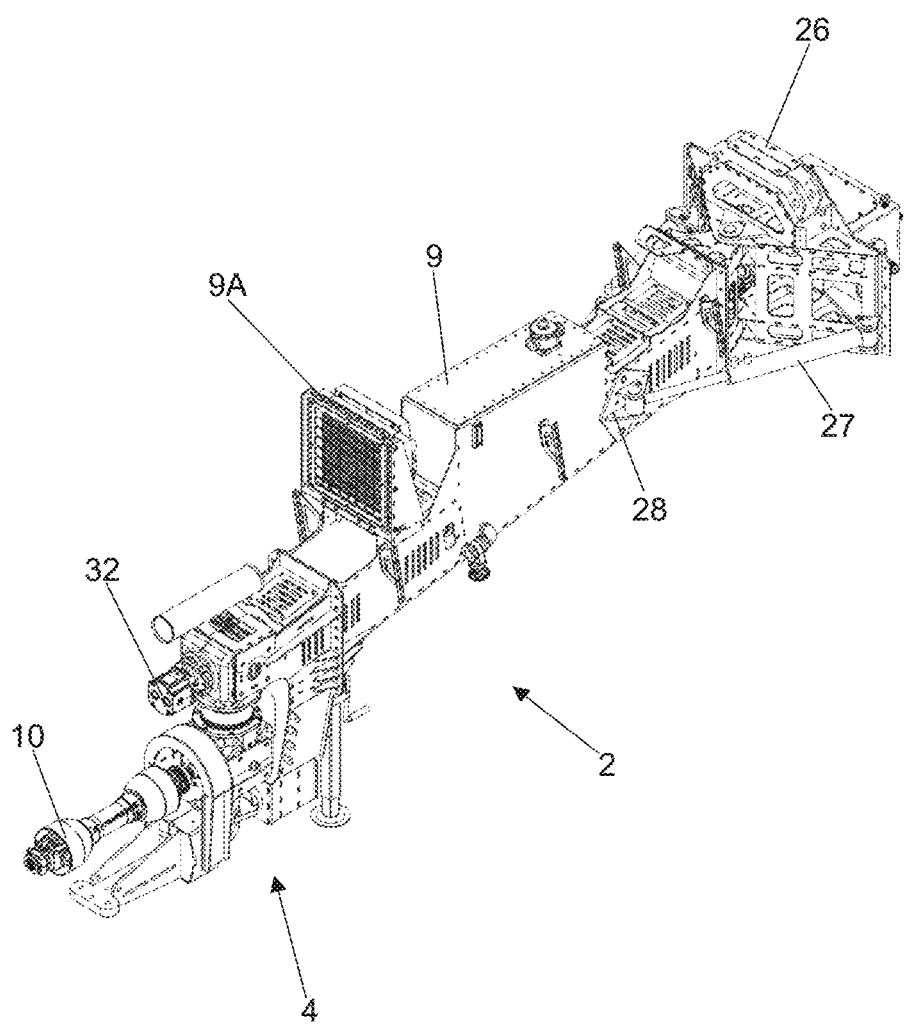
FIG. 4: Perspective view of the head combination.
Figure 5:
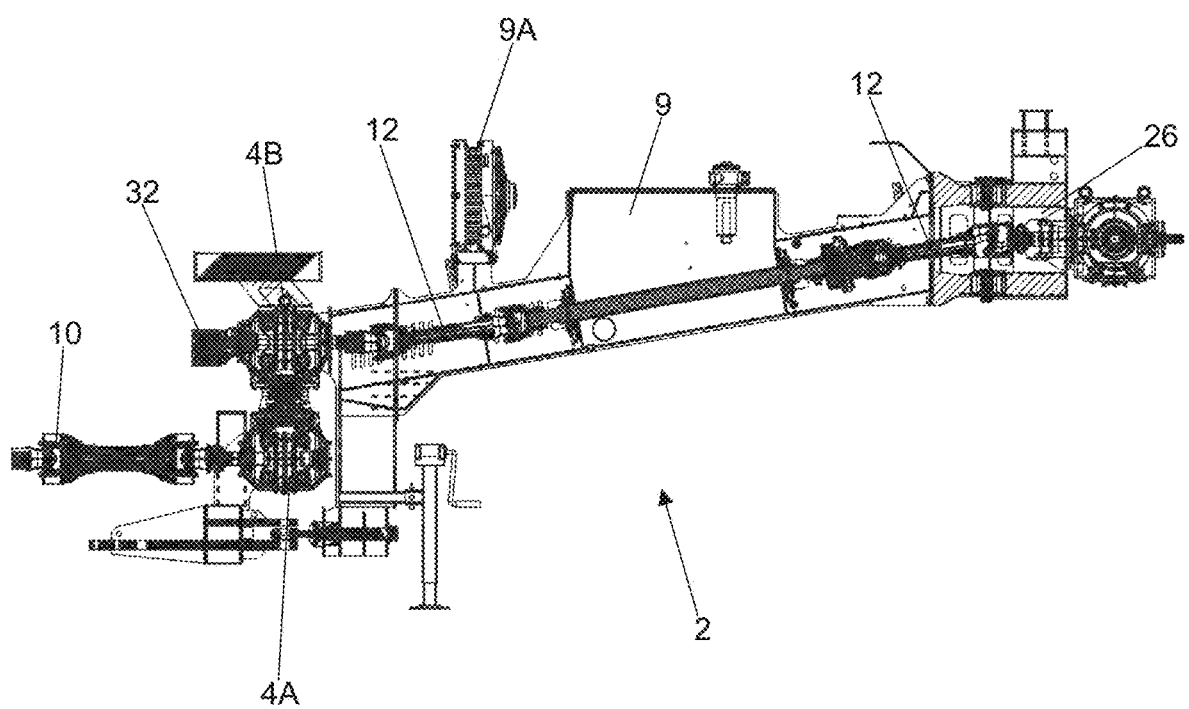
FIG. 5: Cutaway side view of the head combination, with details of the mechanical transmission elements.
Figure 6:
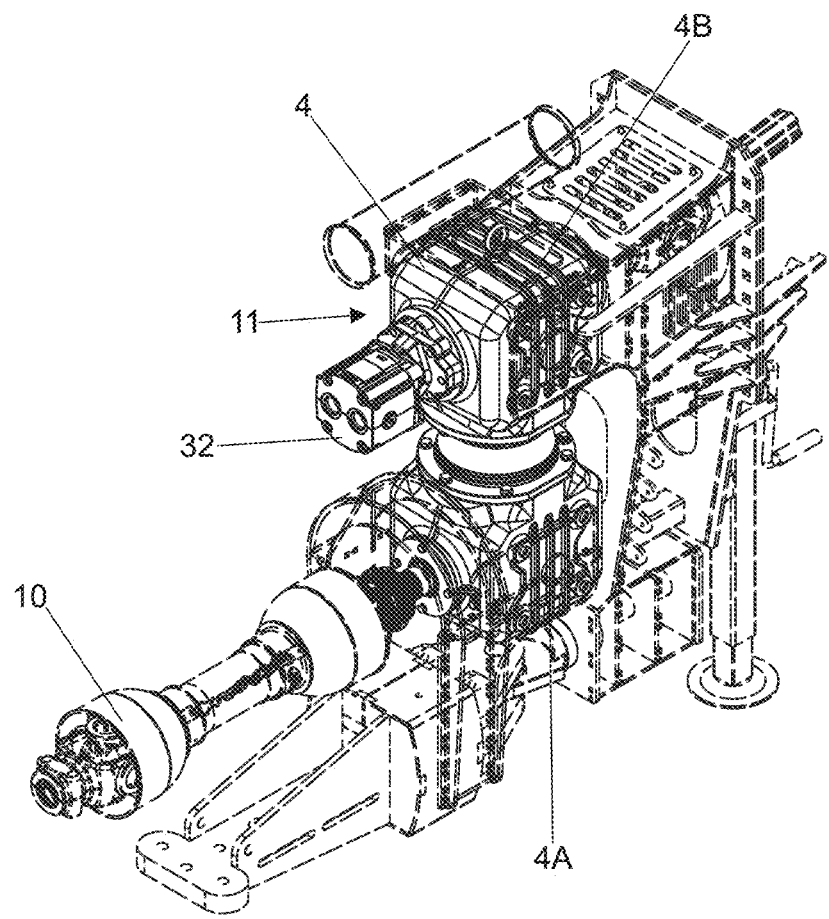
FIG. 6: Perspective view of the dual and pivoting transmission box with availability for coupling a hydraulic pump.
Figure 7:
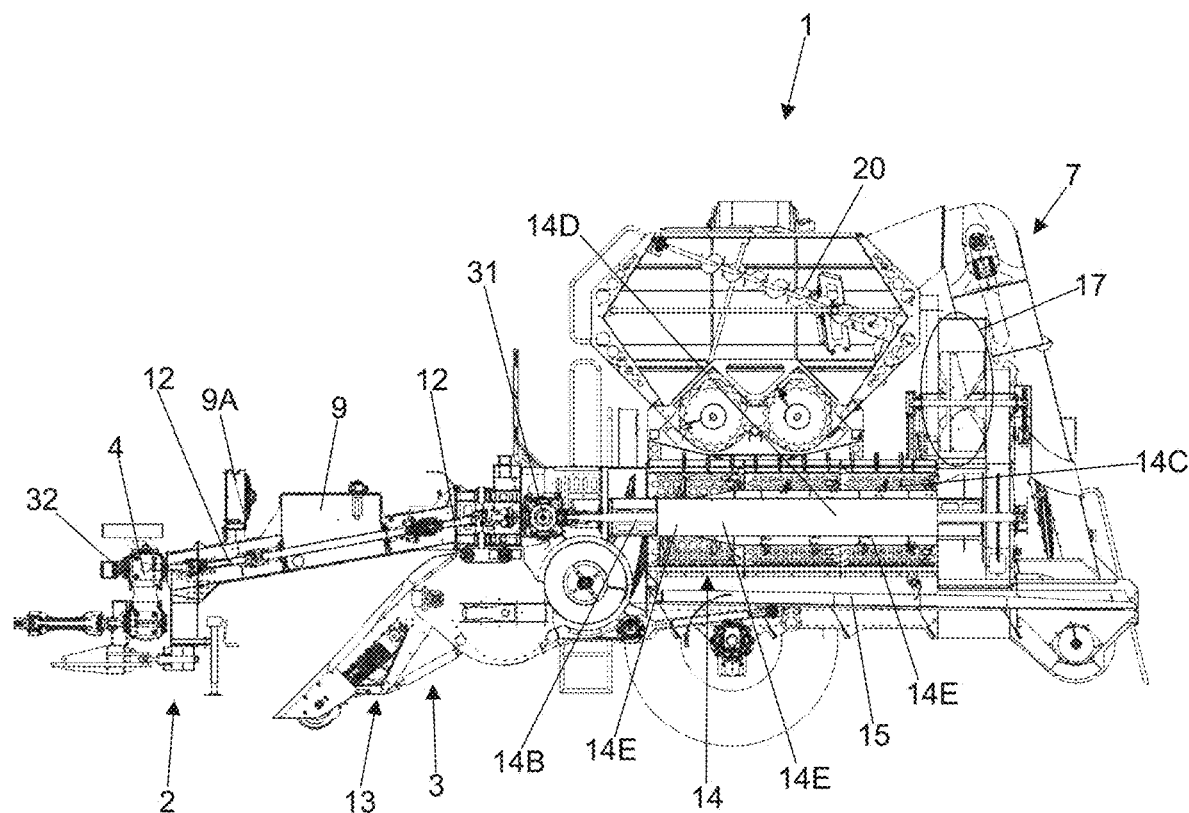
FIG. 7: Cutaway side view of the machine, focusing on the threshing cylinder and the sieves.
Figure 8:
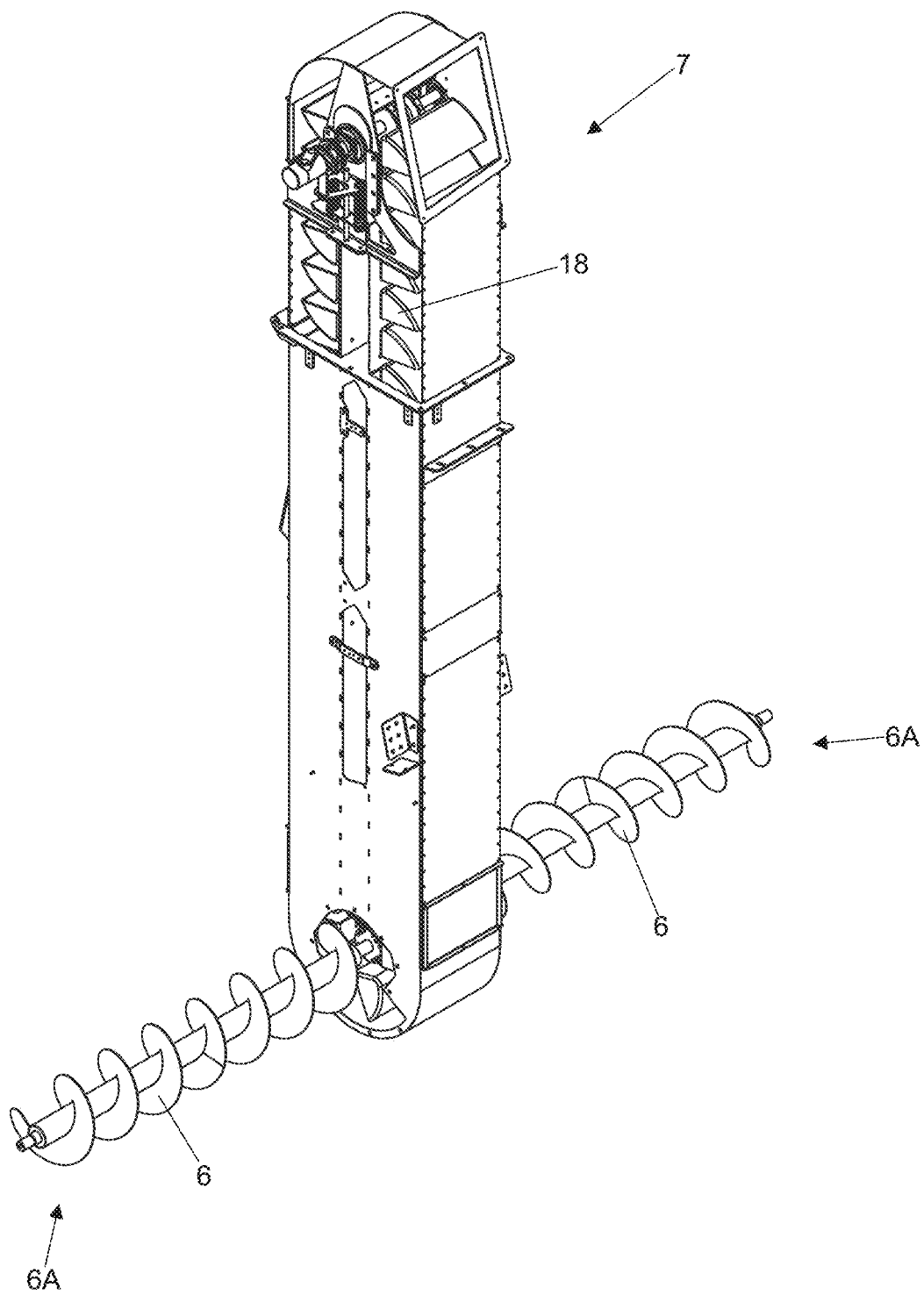
FIG. 8: Perspective view of the vertical transport system with dual input.
Figure 9:
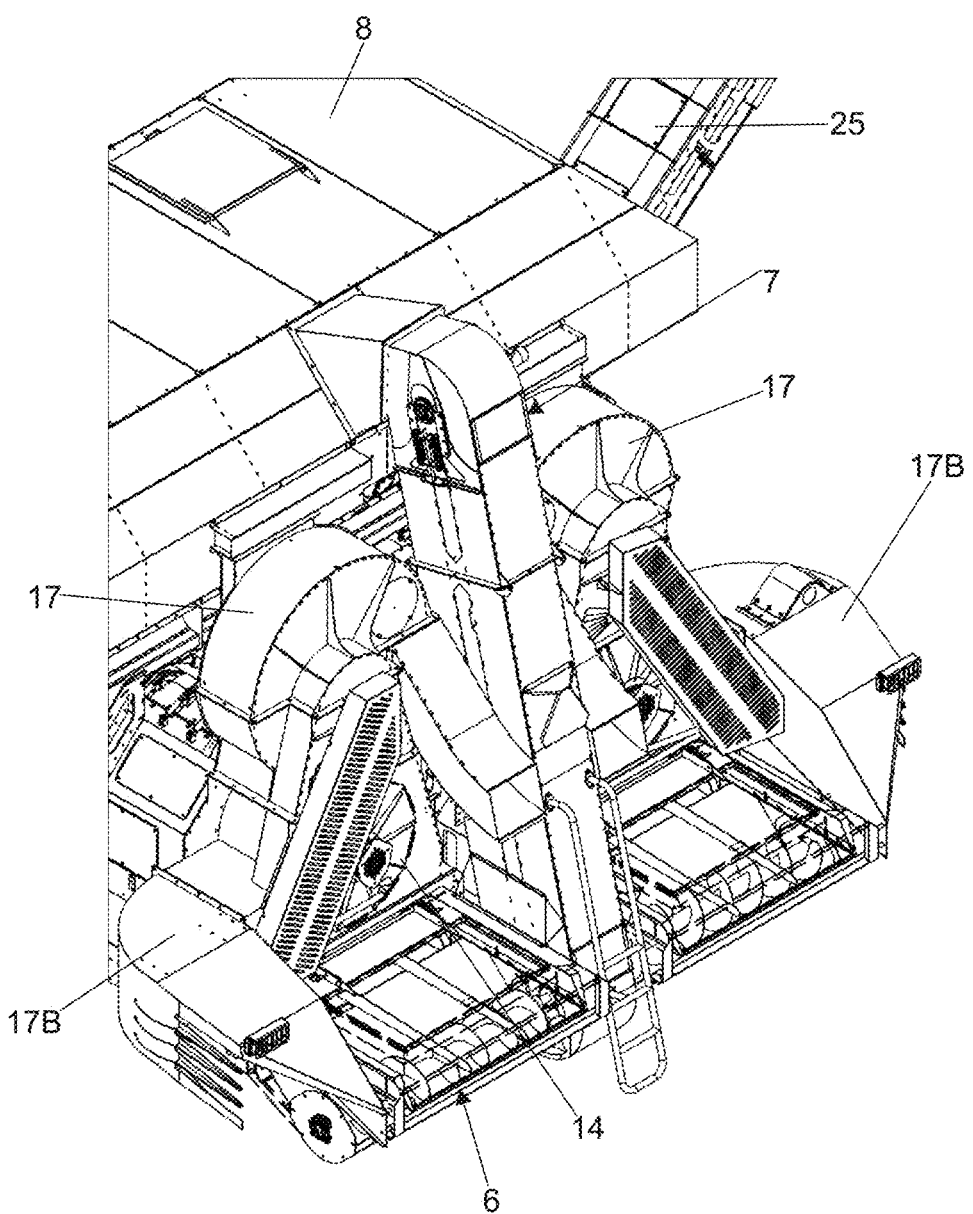
FIG. 9: Perspective view of the arrangement of the vertical transport system in the equipment.
Figure 10:
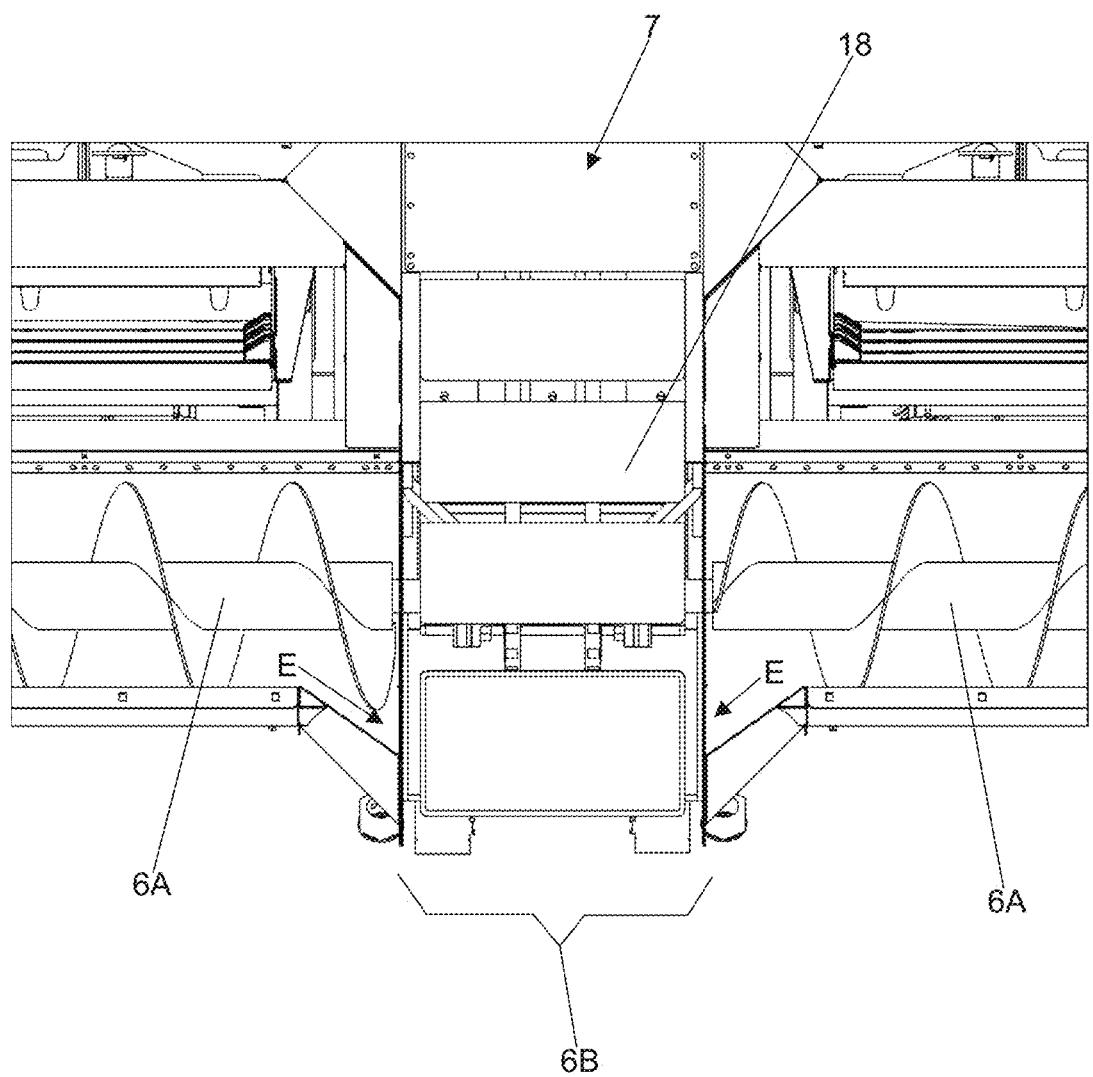
FIG. 10: Partial rear view of the vertical transporter, with detail of the material flow input (E)
Figure 11:
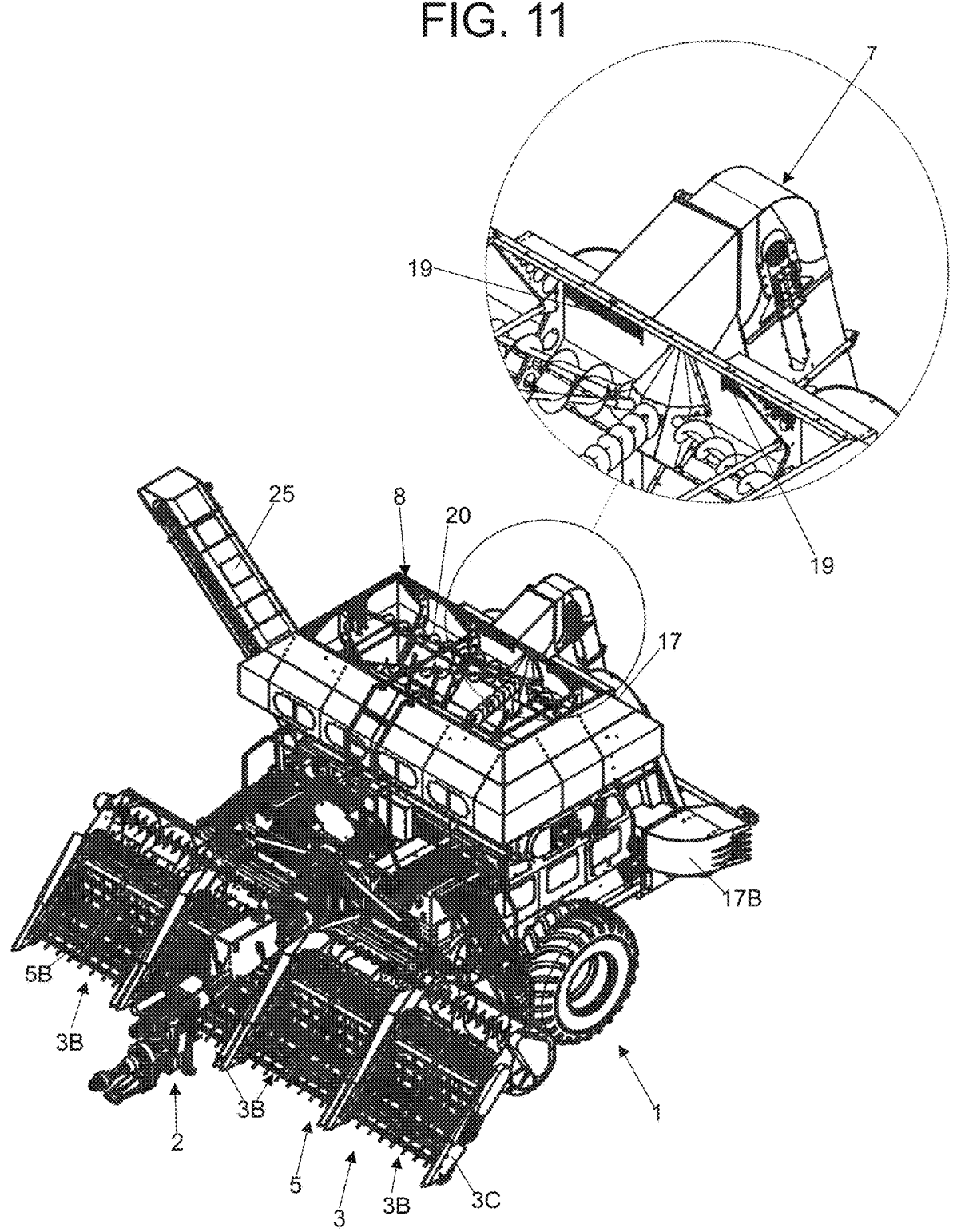
FIG. 11: Isometric view of the equipment, showing the container without the lid with detail of the debris catchment region.
Figure 12:
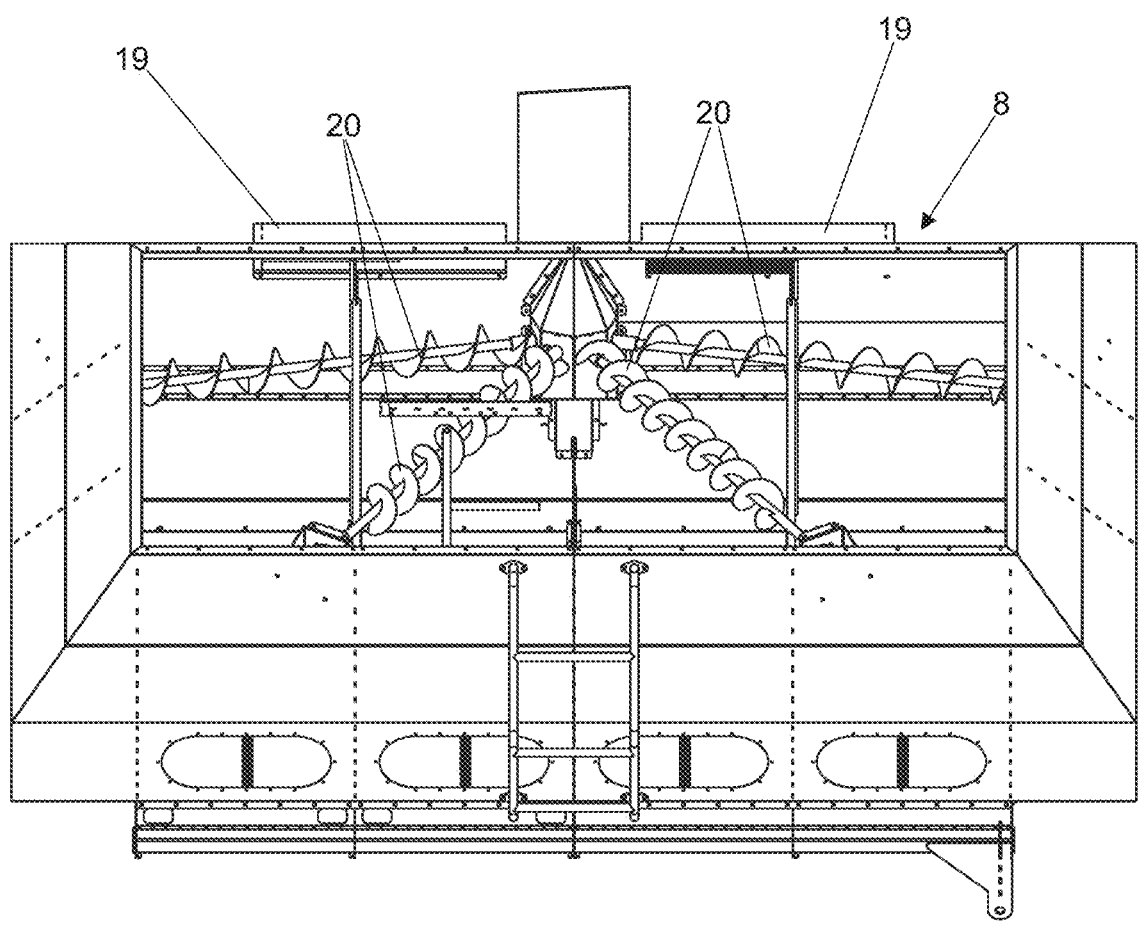
FIG. 12: Top view of the container without the lid.
Figure 13:
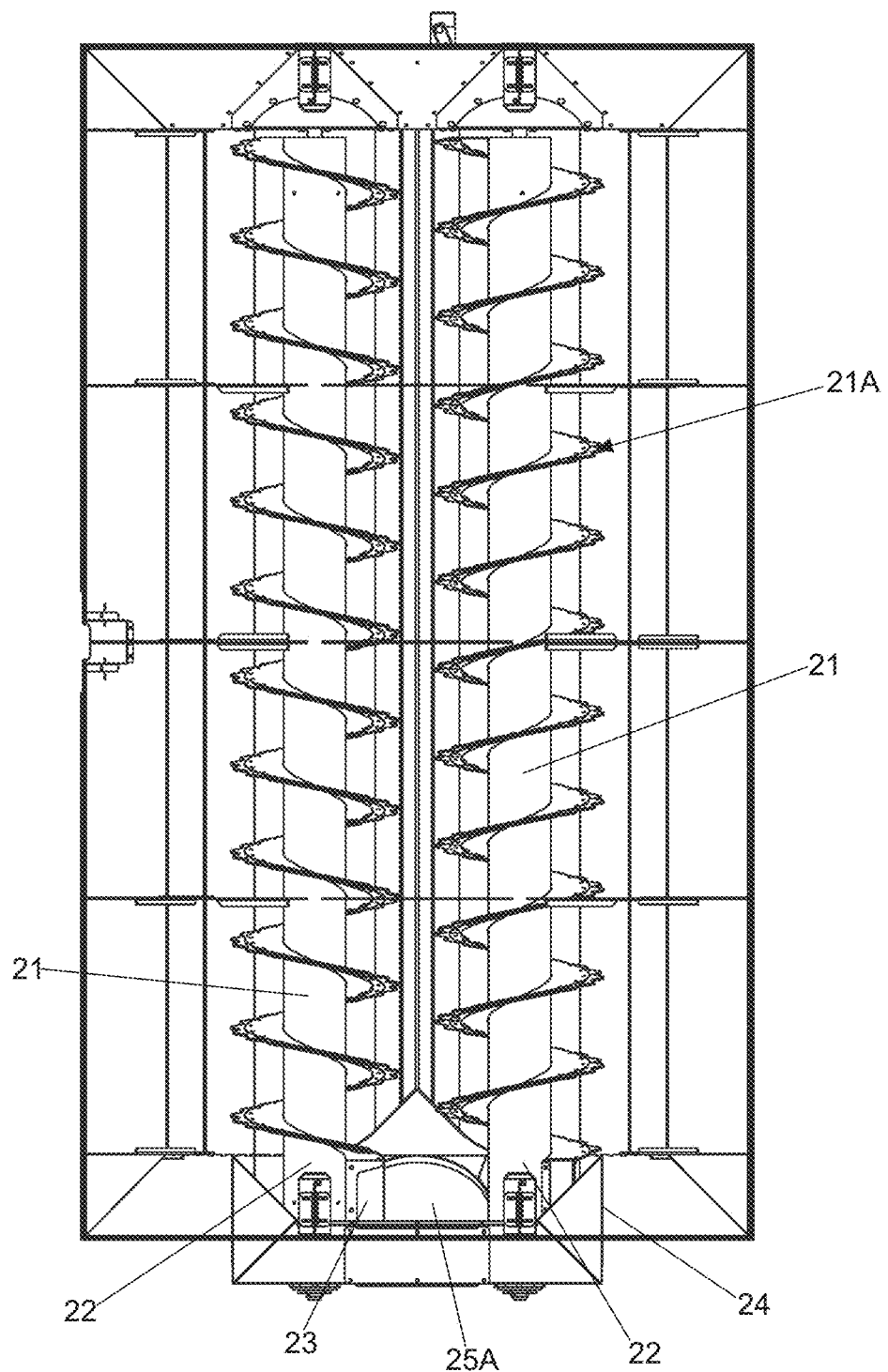
FIG. 13: Cutaway view, with detail of the opening and fin of the container with unloading system.
Figure 14:
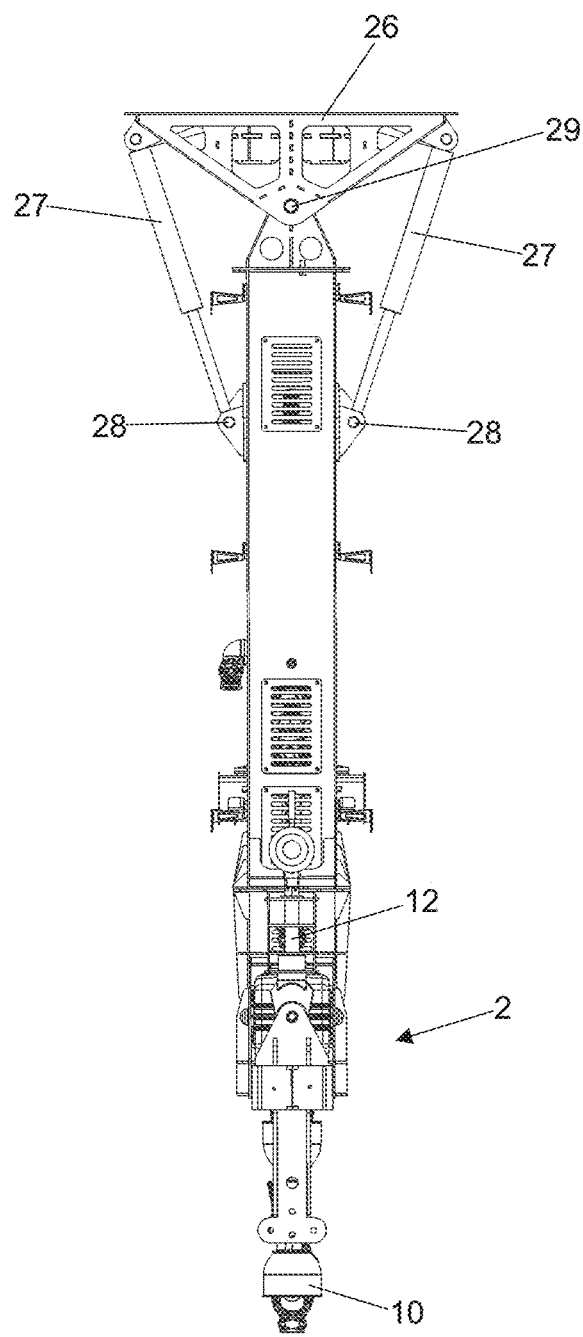
FIG. 14: Top view of the head combination.
Figure 15:
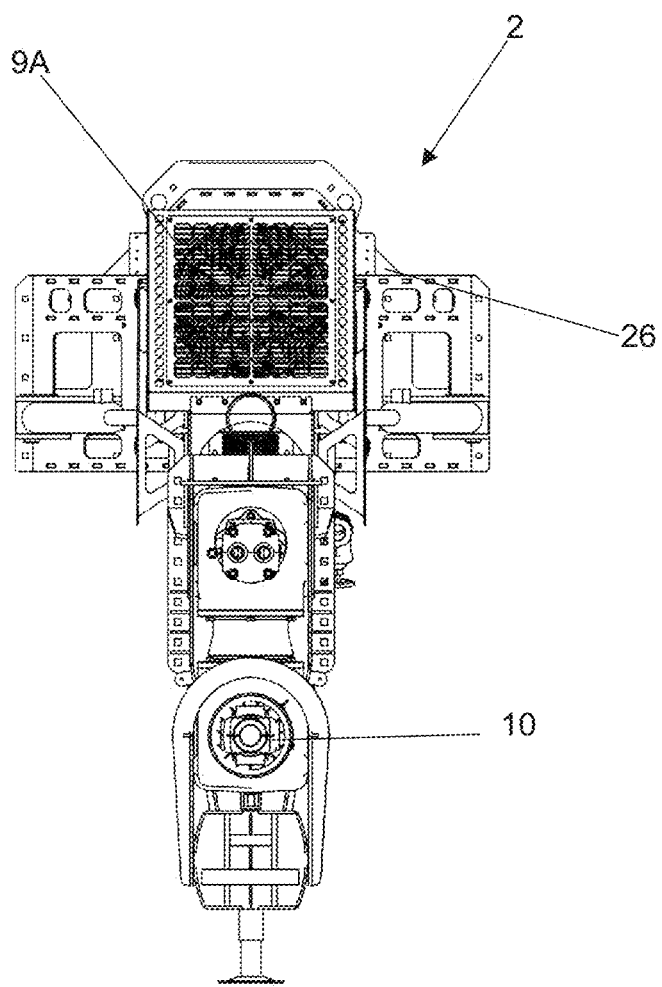
FIG. 15: Front view of the head combination.
Figure 16:
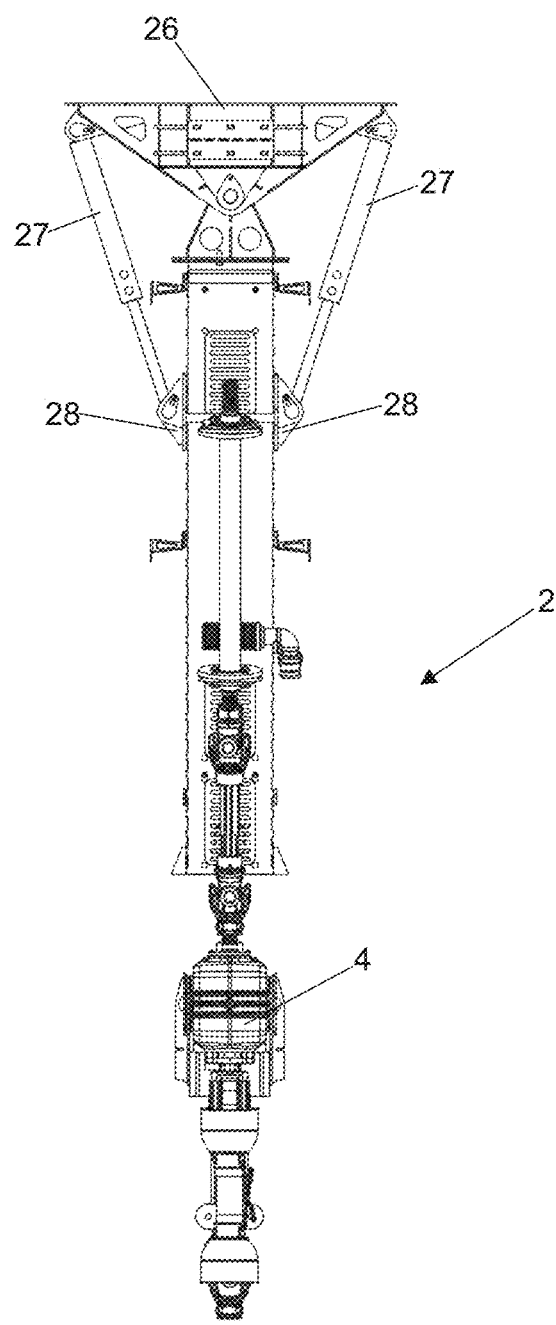
FIG. 16: Top view of the head combination, with details of the mechanical transmission elements.
Figure 17:
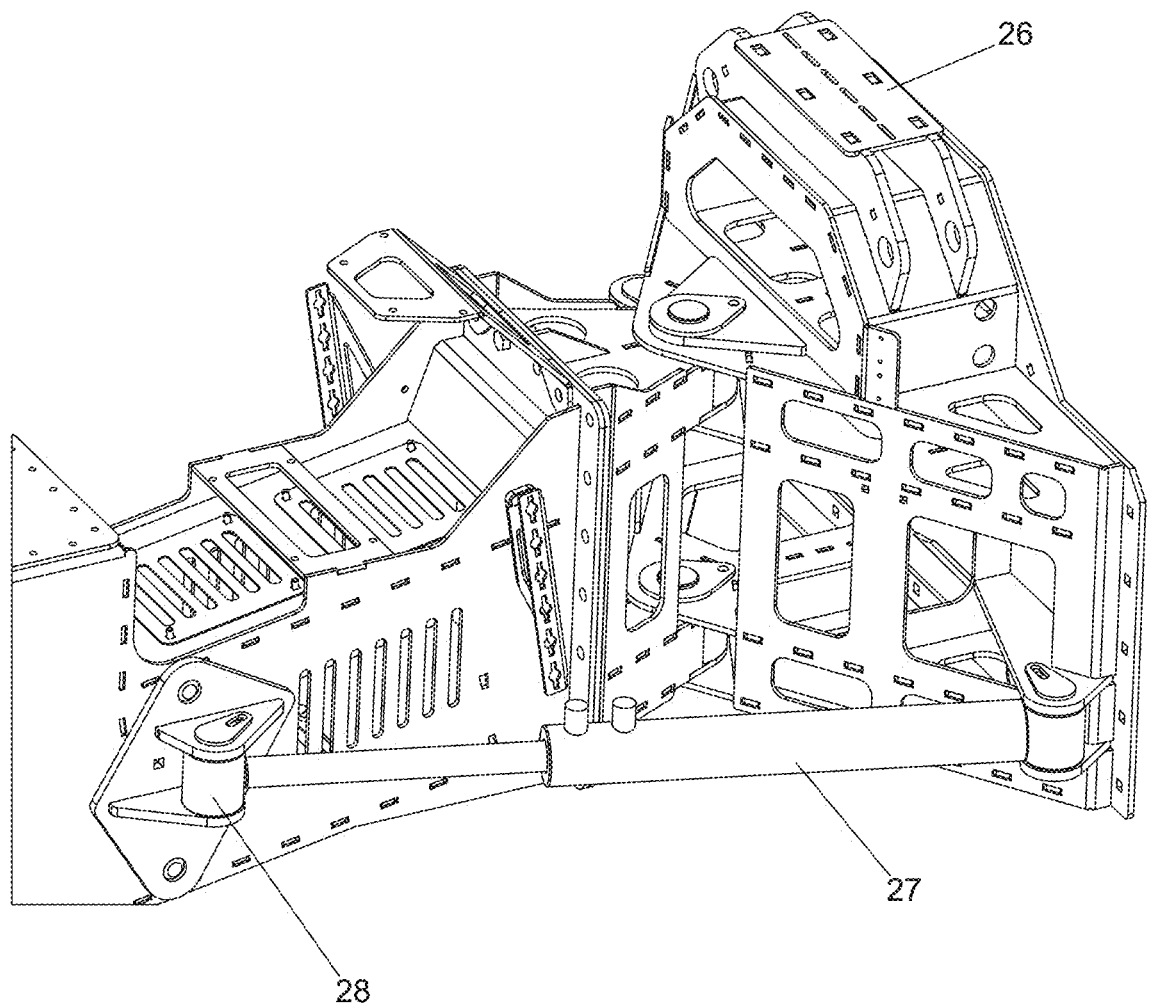
FIG. 17: Partial perspective view of the head combination, with blown-up details.
Figure 18:
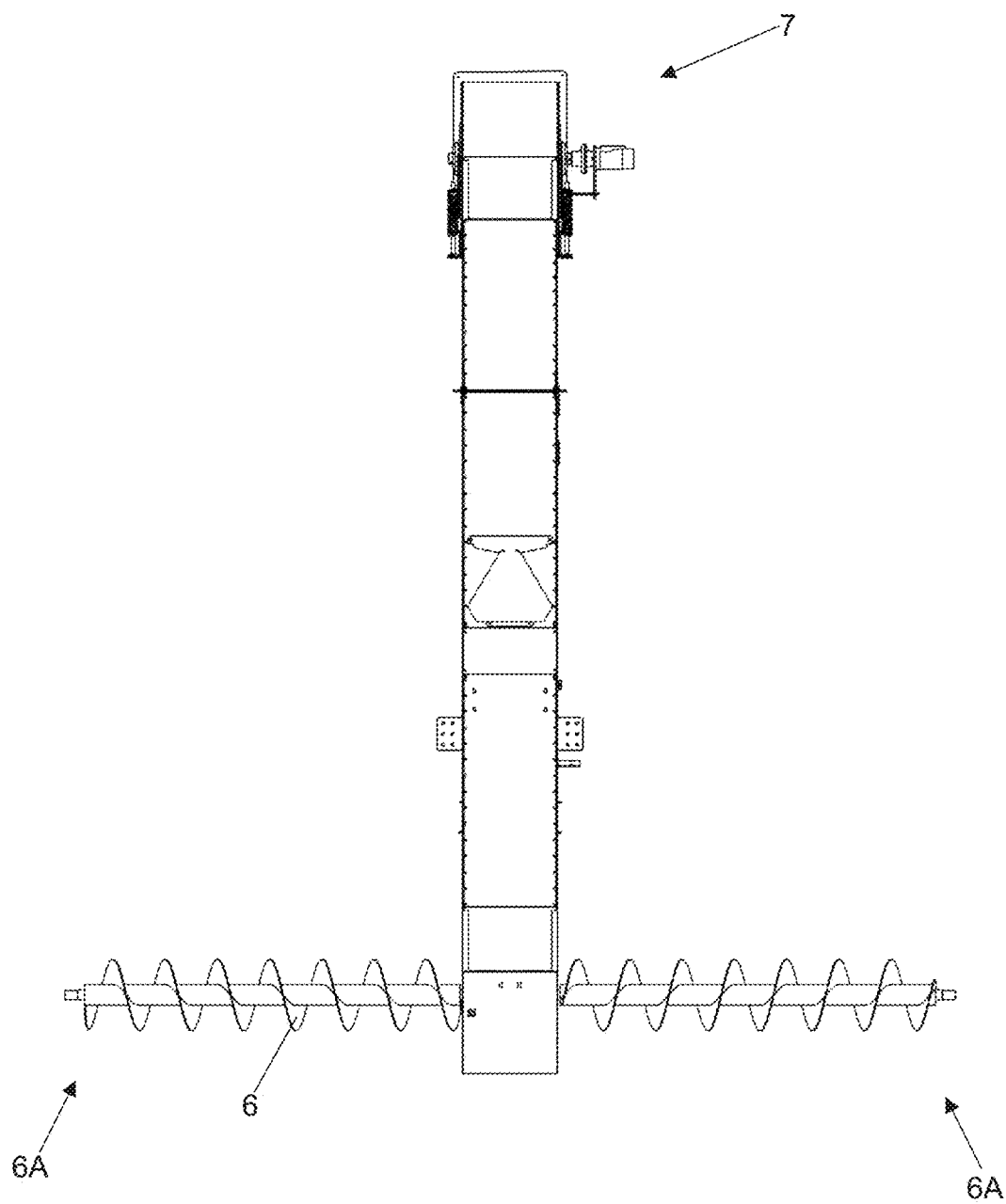
FIG. 18: Rear view of the vertical transport system with dual input.
Figure 19:
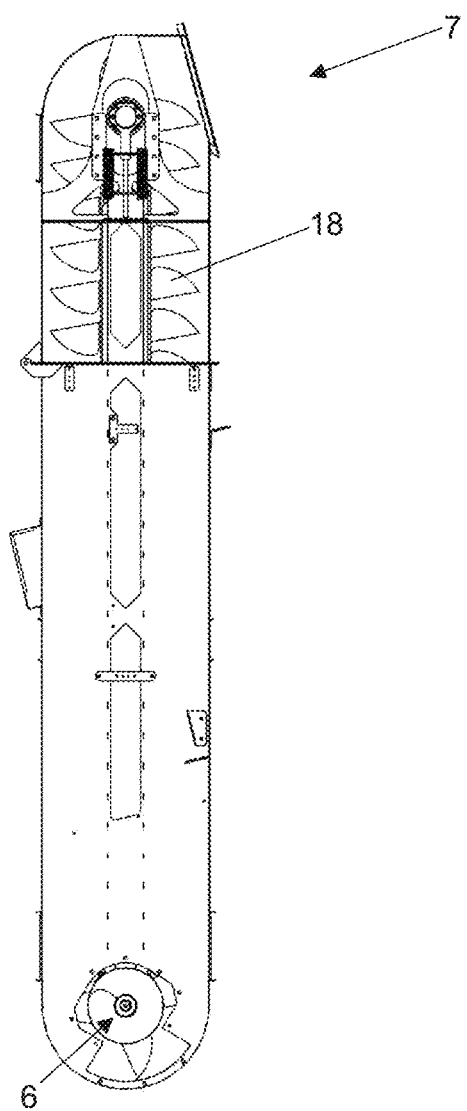
FIG. 19: Side view of the vertical transport system with dual input.
Figure 20:
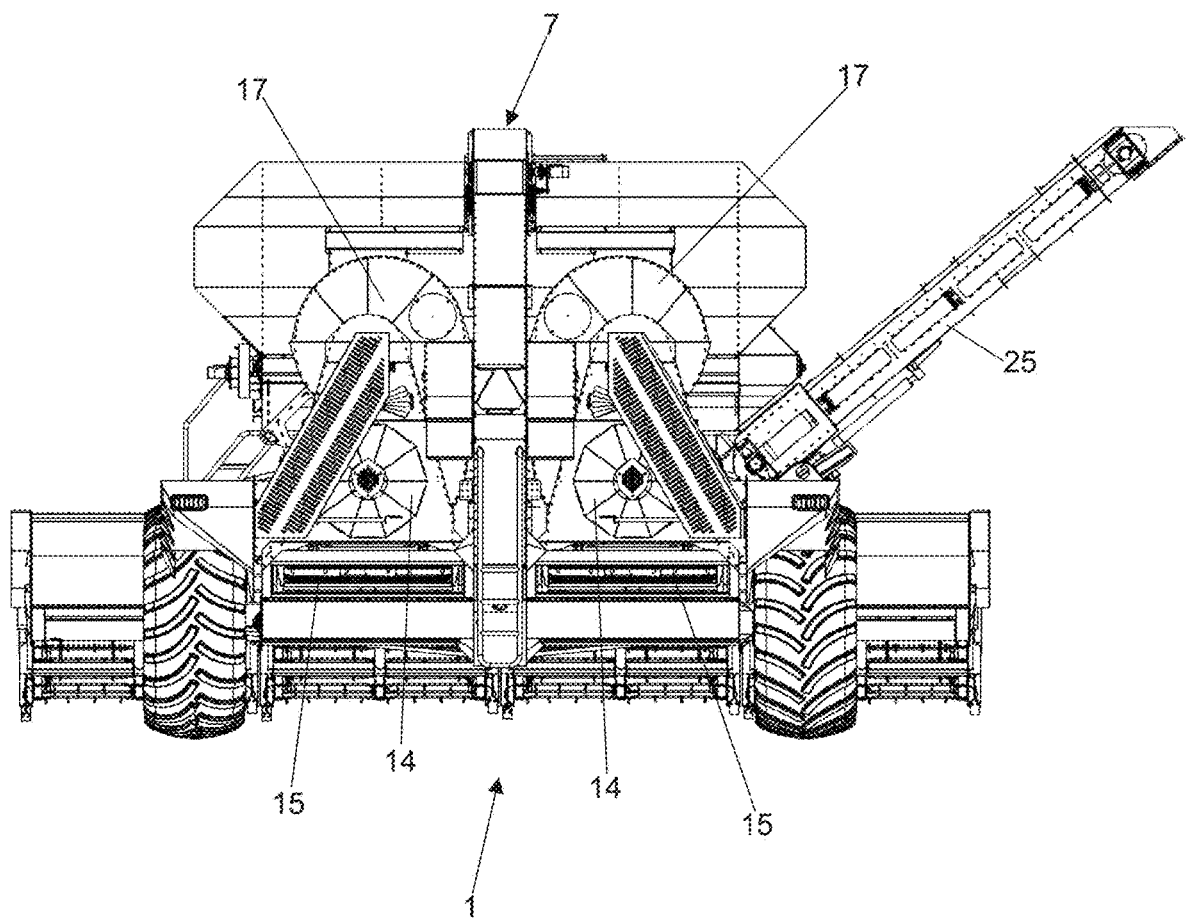
FIG. 20: Rear view of the equipment, showing the vertical transport system with dual input.
Figure 21:
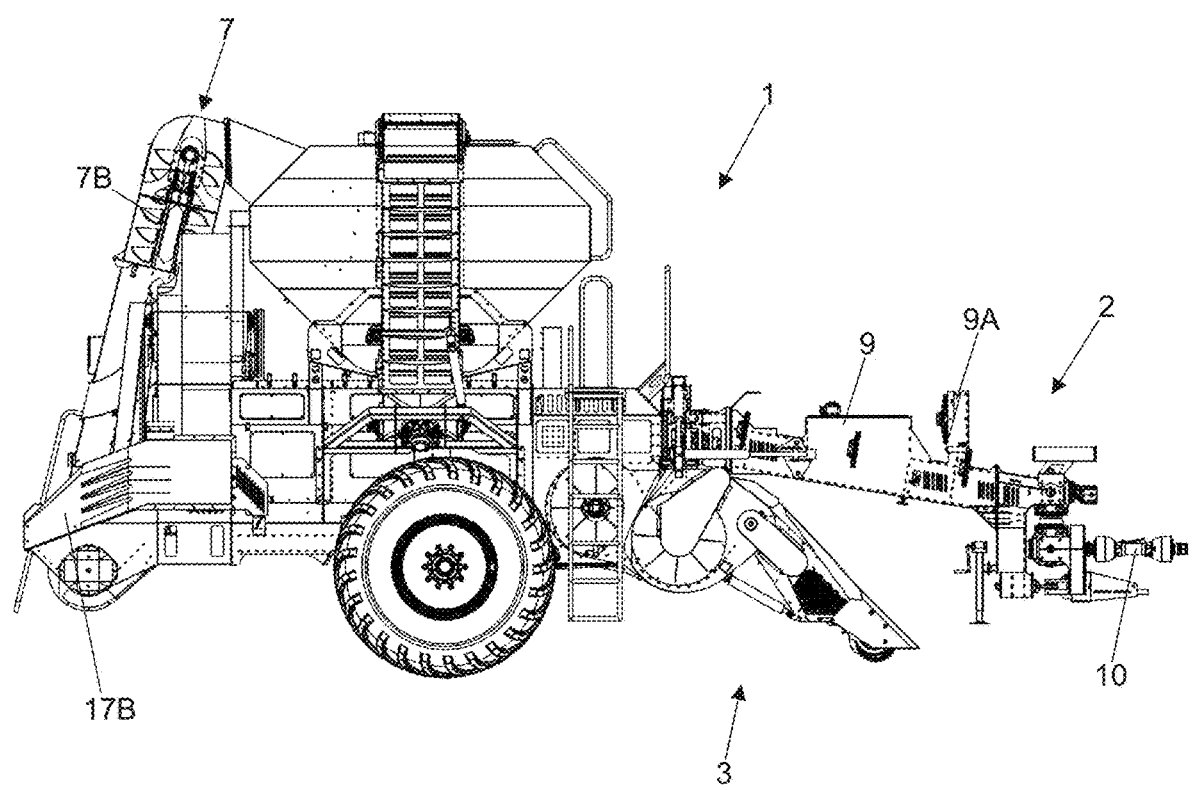
FIG. 21: Side view of the equipment, focusing on the vertical transport system with dual input in the equipment and the head.
Figure 22:
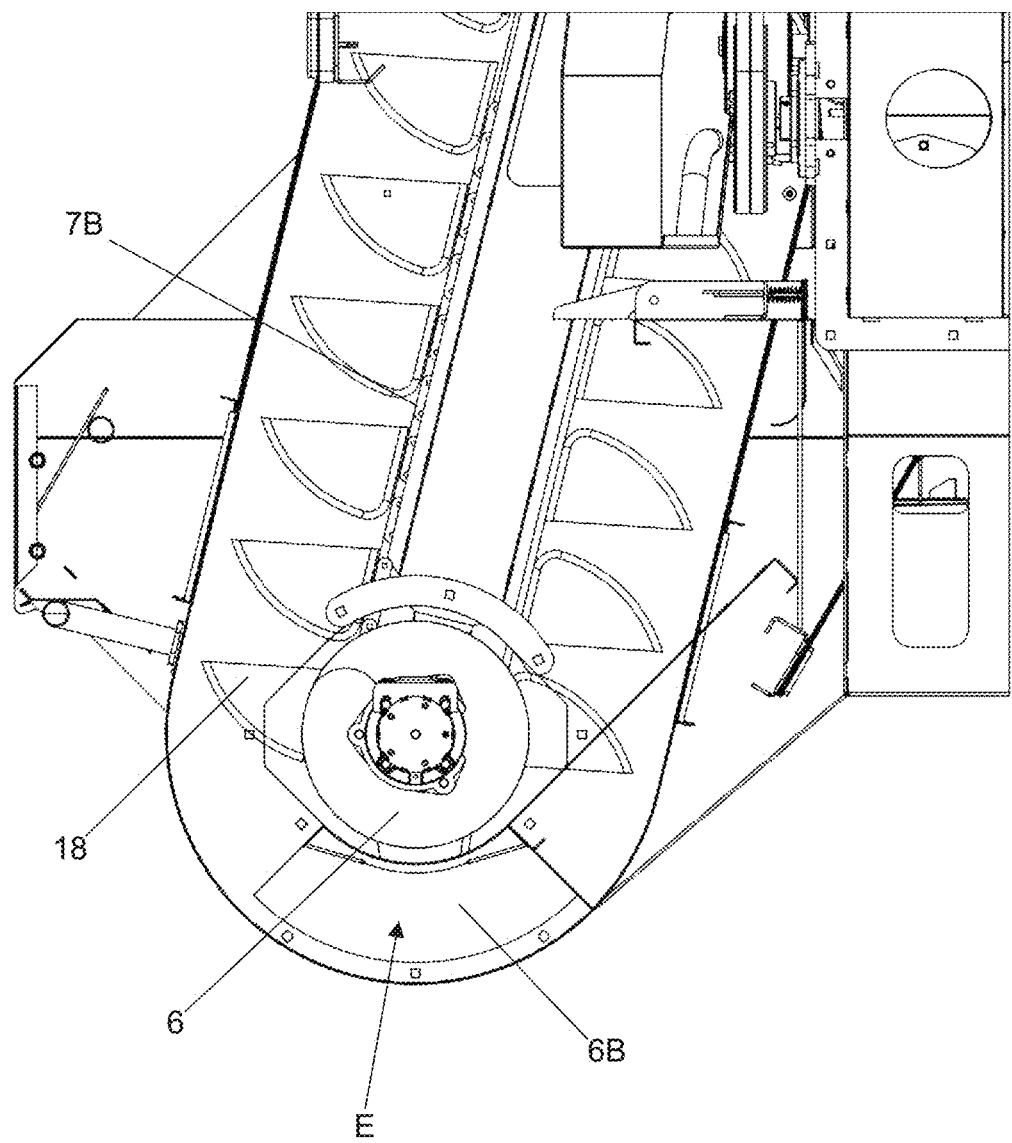
FIG. 22: Partial side view of the vertical transporter, with detail of the material flow input (E)
Figure 23:
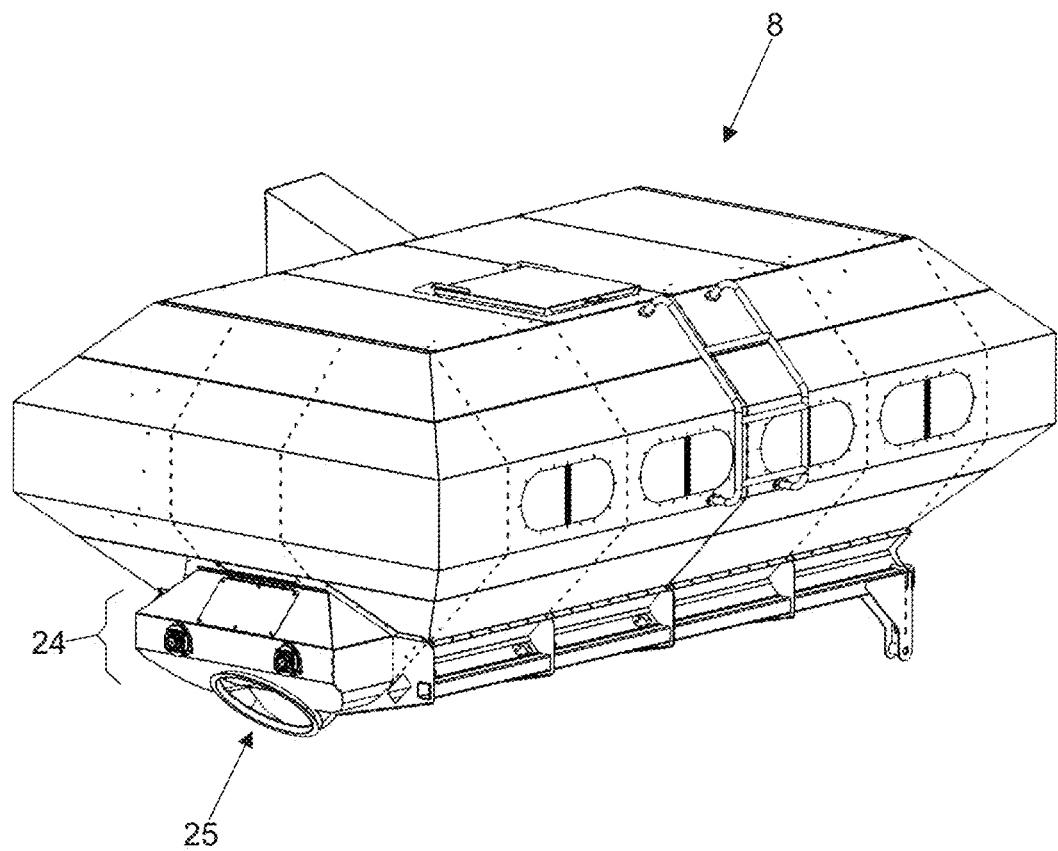
FIG. 23: Perspective view of the container, taken in isolation.
Figure 24:
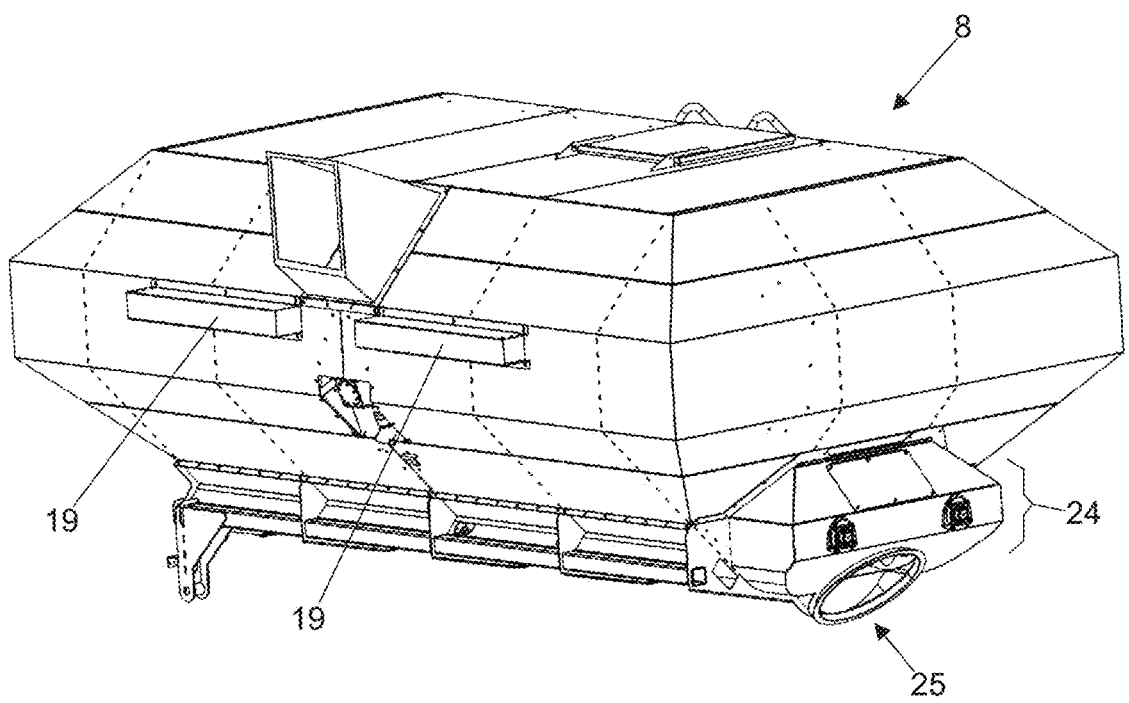
FIG. 24: Perspective view of the container, taken in isolation, shown from another angle.
Figure 25:
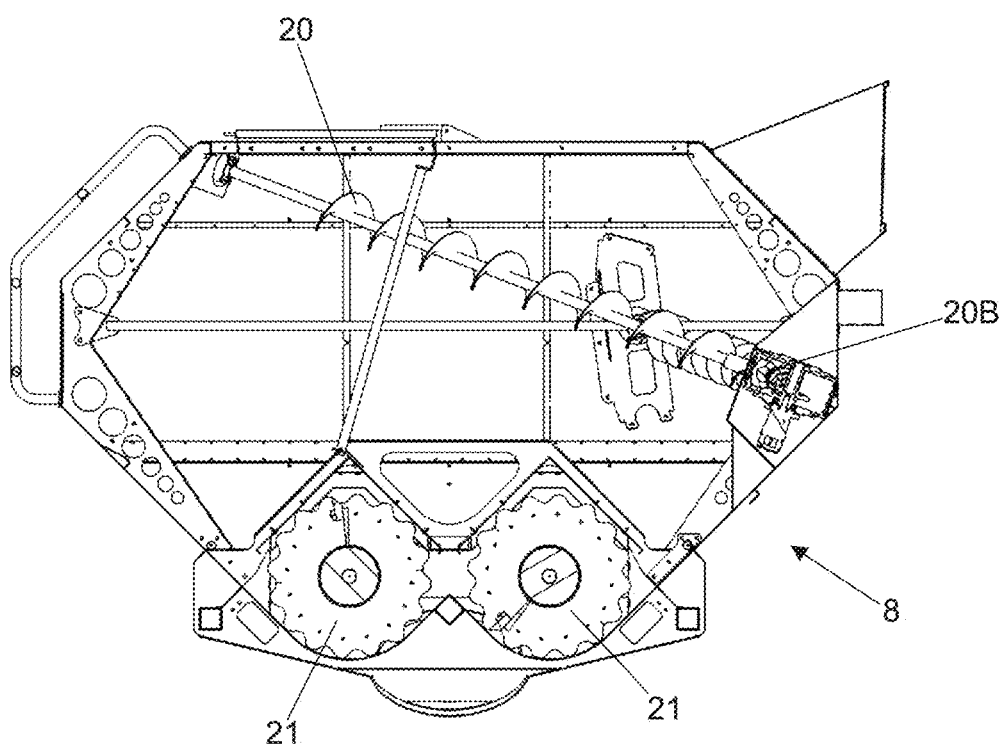
FIG. 25: Cutaway sectional view of the container.
Figure 26:
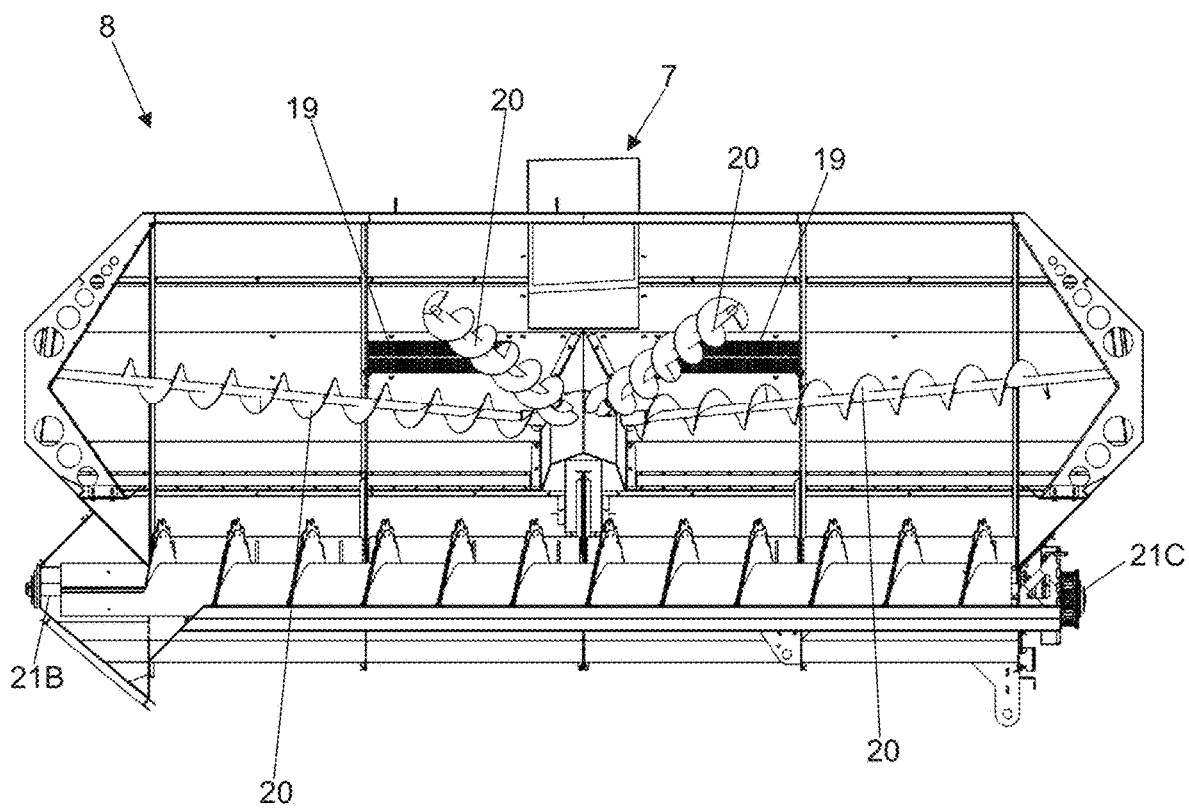
FIG. 26: Cutaway longitudinal side view of the container.

The GRAIN-HARVESTING FARMING EQUIPMENT object of this application for patent of invention is designed for harvesting farming produce disposed in rows, such as peanuts and beans. It comprises large-scale equipment for large harvest volumes, in addition to comprising arrangement improvements to facilitate manufacturing, assembly, maintenance and provide performance gains. Its performance is comparable to that of two conventional machines, but on a single chassis. The invention encompasses efficiency gains by using mostly mechanical transmissions (cardans and transmission boxes), besides simplifying the number of components. The cleaning system also presents performance gains.

Technically, it comprises farming equipment (1) of the head (2) traction type and endowed with collecting platform (3) with belts (5), said head (2) being coupled to the traction bar of a farming vehicle—tractor—; the head (2) comprises a transmission box (4) of the dual and pivotable type, as well as a heat exchanger (9A), and all the combinations are modular, which contributes to the manufacturing and maintenance of said farming equipment (1).

The head (2) has a structure (26) fastenable to the chassis of the farming equipment (1), on which there are pivotably coupled telescopic cylinders (27), whose opposite ends are coupled at points (28) foreseen on the sides of the body of the head (2), to provide a small sideward movement of the head (2) by way of the central pivoting point (29). The head (2) has also complete hydraulic system, including hydraulic oil tank (9), heat exchanger (9A), filters and others.

The transmission box (4) is responsible for propagating rotary movement coming from the tractor's power take-off, by way of the cardan (10), for the mechanical systems coupled to said transmission box (4), latter also having an auxiliary input (11) to couple an accessory such as, for example, an hydraulic pump and, therefore, utilize the movement of the transmission box (4) to drive auxiliary systems.

The dual and pivotable transmission box (4) distributes power and torque by way of cardans (12) embedded within the structure (26) of the head (2) to the harvest systems, in particular a collecting platform (3) and processing, which consists of cleaning, sorting and storing clean grain in relation to the debris. The under part (4A) of the transmission box (4) connects to the upper part (4B) of said transmission box (4), such that the cardan (10) is driven by the tractor's power take-off.

The collection system consists of belts (5) disposed on the collecting platform (3), driven by the transmission mechanism (13); this system collects the rows of material on the ground. The collected material is driven inside the equipment, where the grain is sorted by two threshing cylinders (14), disposed axially; and under each threshing cylinder (14) there is positioned a vibratory sieve (15), establishing two separate material flows.

The collecting platform (3) has various modules (3B) that operate independently, each being endowed with a copying system (3C) in relation to the ground, whereas the belt (5) of each module (3B) has a plurality of fingers (5B), the movement of said belts being promoted by transmission mechanism (13) from a hydraulic motor (13A), whereas, via mechanical transmission (5D), a rolling system (5E) drives a shaft with scrapers (5F) above the belt (5).

The threshing cylinders (14) are rotated by actuation by means of driving axle (14B) from the rotation of the cardan (12), so as to project the shaft (30) that couples in a transmission box with reducer (31) to provide ideal rotation to said threshing cylinders (14), these being concentrically enveloped by sieves (14C), which promote the first sorting;

the threshing cylinders (14) disclose in their extension flexible elements (14D) distributed in three different sections (14E).

Beneath the threshing cylinders (14) are the vibratory sieves (15) which operate by means of a conventional eccentric independent movement system, the function of each vibratory sieve (15) being to sort the smaller impurities which fall through orifices (16), grain and a portion of impurities remaining, such as leaves and twigs; a portion of the lighter debris is vacuum-extracted, by the use of vacuum devices (17), which direct said materials via conduits (17B) outwardly of the farming equipment (1).

In the collecting and sorting system of the material gathered on the ground, there is a cleaning process separating debris and clean grain that is sent to helicoids (6), from where the material is directed to the vertical transporter (7) positioned at the center of the farming equipment (1), so as to unload the grain into the center of the container (8). The sorted grain is directed to the respective helicoids (6) which, in turn, direct the flow to the vertical transporter (7), to the center of the farming equipment (1); accordingly, the opposite sides (6A) of the helicoids (6) have counter generation, with a view to providing said directioning of the grain released to said vertical transporter (7).

The invention provides a transition region (6B) between the helicoids (6) and the respective mugs (18) of the vertical transporter (7), driven by chains (7B), so as to promote smooth loading and prevent damage to the grain. The vertical transporter (7) is positioned, as stated previously, at the center of the farming equipment (1) and, accordingly, unloads the grain into the center of the container (8); this container (8) has at least two air intakes (19), disposed near the unloading region of the vertical transporter (7) which vacuum-capture the remaining impurities.

The grain already disposed inside the container (8) is distributed by helicoids (20) arranged so as to utilize the volume of the container (8), that is, project in directions and at cross-cutting and longitudinal angulations; said rotated helicoids (20), for example, by hydraulic motors (20B).

Therefore, when the reservoir or container (8), is full of grain, two parallel helicoids (21) are used, disposed crosswise to the chassis of the farming equipment (1) and located at the bottom of this reservoir; said parallel helicoids (21) with end bearings (21B) and driven at the opposite ends (21C), for example, via hydraulic motors. Said parallel helicoids (21) further have along their length accompanying the helicoidal path, flexible elements (21A) which decrease the attrition (frictional force) between the walls at the bottom of the container, the grain and the helicoid itself, resulting in less damage to the grain. At the ends (22) of the parallel helicoids (21), where the unloading takes place, is a fin (23) to facilitate this operation, that is, unloading the grain without damage.

Said parallel helicoids (21) direct the flow of grain to a transition region (24) having a prism format between the container (8) and the side transporter (25), which unloads the grain; said transition region (24) has a slanted opening (25A) for the output of the grain onto the side transporter (25).

Therefore, the invention has various differentiating factors in relation to other equipment known in the state of the art, such as the compact head (2) integrated with the hydraulic system, which facilitates maintenance; said head (2) containing a dual and pivoted transmission box (4) with availability for coupling a hydraulic pump, besides the oil tank (9) integrated to the structure and, heat exchanger (9A), with an arrangement that favors its performance, as it permits a flow of free air without obstructions and also with a lower susceptibility to the entry of dust preventing clogging.

The vertical transport system with dual feed makes better use of the space available, allowing a more rational utilization of the width of the farming equipment (1) for processing the grain, so as to simplify the transport system and enable better distribution of grain in the container (8).

This unprecedented construction of the farming equipment (1) further gives the combination robustness and reliability in its use of mechanical transmissions by gears and cardan (10).

The cleaning system and vacuum sorting at the unloading point of the vertical transporter (7) in the container (8) confers greater efficiency in cleaning the grain.

The modular composition of the farming equipment (1), from the collecting platform (3) to the system of helicoids (6), vertical transporter (7) and container (8) facilitates not only manufacturing but also disassembly for transport.

With regards to the container (8), the more efficient grain distribution system provides for improved occupation of the volume of said container (8) by using a system of at least four helicoids (20).

The present invention, though particularly indicated for large harvest volumes, consists of an integrated machine idealized to include rational operation, utilizing some known characteristics and other innovative ones. There is thus provided a large harvest volume with a significantly expressive yield in relation to other equipment of the art cited in this specification. Additionally, although it is a large-scale machine, its technology is based on mechanical concepts and elements that are integrated to facilitate assembly and disassembly processes of the farming equipment (1), chiefly in preventive or corrective maintenance procedures.

The invention claimed is:

1. A grain-harvesting farming equipment for harvesting farming produce disposed in rows, such as peanuts and beans, comprising:
    a modular farming equipment (1) driven by a head (2), and comprising a collecting platform (3) with belts (5), a threshing cylinder (14), vibratory sieves (15), a vacuum device (17), a vertical transporter (7) and a container (8), wherein said head (2) is coupled to a traction bar of a farming vehicle; wherein the head (2) unites a dual and pivotable transmission box (4), a hydraulic oil tank (9), a heat exchanger (9A) orientated crosswise to a direction of displacement of the farming equipment (1), and filters; wherein said transmission box (4) connects to a power take-off of the farming vehicle by way of a cardan (10); and wherein said transmission box (4) comprises an auxiliary input (11) to couple an accessory that can be hydraulic, pneumatic or electric in order to drive auxiliary systems.

2. The grain-harvesting farming equipment of claim 1, wherein the head (2) has a structure (26) fastenable to a chassis of the farming equipment (1), said structure (26) comprising pivotably coupled telescopic cylinders (27) whose opposite ends are coupled at points (28) foreseen on the sides of a body of the head (2), and wherein the body of the head (2) has a central pivoting point (29).

3. The grain-harvesting farming equipment of claim 1, wherein the dual and pivotable transmission box (4) connects to cardans (12) embedded within the structure (26) of the head (2) to connect to harvest systems and processing.

4. The grain-harvesting farming equipment of claim 1, wherein a collection system contains belts (5) disposed on the collecting platform (3) being driven by a transmission system (13) by a hydraulic motor (13A).

5. The grain-harvesting farming equipment of claim 1, wherein clean grain is sent to helicoids (6), which extend to the vertical transporter (7) positioned at the center of the farming equipment (1); and wherein said vertical transporter (7) extends to the center of the container (8).

6. The grain-harvesting farming equipment of claim 5, wherein opposite sides (6A) of the helicoids (6) have left and right orientation with respect to said vertical transporter (7).

7. The grain-harvesting farming equipment of claim 1, further comprising a transition region (6B) between the helicoids (6) and respective mugs (18) of the vertical transporter (7).

8. The grain-harvesting farming equipment of claim 1, wherein the container (8) has two air intakes (19) disposed near the unloading region of the vertical transporter (7).

9. The grain-harvesting farming equipment of claim 1, wherein inside the container (8) there are provided helicoids (20) distributed in crosswise and longitudinal directions and angulations so as to utilize a volume of the container (8).

10. The grain-harvesting farming equipment of claim 9, wherein in the container (8) there are two parallel helicoids (21) disposed crosswise to the chassis of the farming equipment (1) and located at a bottom of the container; at an end (22) of the helicoid (21) there is a fin (23), whereas the parallel helicoids (21) connect to a transition region (24) between the container (8) and a side transporter (25), which unloads the grain; and wherein said transition region (24) has a slanted opening (25A) communicative with the transporter (25).

11. The grain-harvesting farming equipment of claim 10, wherein the helicoid (21) has flexible fins (21A) fastened and distributed along the helicoid following a helicoidal path.

12. The grain-harvesting farming equipment of claim 5, comprising a transition region (6B) between the helicoids (6) and respective mugs (18) of the vertical transporter (7).

13. The grain-harvesting farming equipment of claim 6, comprising a transition region (6B) between the helicoids (6) and respective mugs (18) of the vertical transporter (7).

14. The grain-harvesting farming equipment of claim 8, wherein inside the container (8) there are provided helicoids (20) distributed in crosswise and longitudinal directions and angulations so as to utilize the volume of the container (8).

15. The grain-harvesting farming equipment of claim 4, wherein inside the equipment the threshing cylinders (14) disposed axially; and under each threshing cylinder (14) are positioned two vibratory sieves (15) having independent movements; and wherein the threshing cylinders (14) are concentrically enveloped by sieves (14C).

\* \* \* \* \*